US011531818B2

(12) United States Patent
Kim et al.

(10) Patent No.: US 11,531,818 B2
(45) Date of Patent: Dec. 20, 2022

(54) DEVICE AND METHOD FOR MACHINE READING COMPREHENSION QUESTION AND ANSWER

(71) Applicant: 42 Maru Inc., Seoul (KR)

(72) Inventors: Dong Hwan Kim, Seoul (KR); Hyun Ok Kim, Gyeonggi-do (KR); Woo Tae Jeong, Gyeonggi-do (KR)

(73) Assignee: 42 MARU INC., Seoul (KR)

( * ) Notice: Subject to any disclaimer, the term of this patent is extended or adjusted under 35 U.S.C. 154(b) by 410 days.

(21) Appl. No.: 16/684,902

(22) Filed: Nov. 15, 2019

(65) Prior Publication Data

US 2021/0149994 A1    May 20, 2021

(51) Int. Cl.

| | |
|---|---|
| *G06F 40/30* | (2020.01) |
| *G06N 20/00* | (2019.01) |
| *G06N 5/04* | (2006.01) |
| *G06F 40/268* | (2020.01) |
| *G06F 40/284* | (2020.01) |
| *G06F 40/295* | (2020.01) |

(Continued)

(52) U.S. Cl.
CPC ............ *G06F 40/30* (2020.01); *G06F 40/268* (2020.01); *G06F 40/284* (2020.01); *G06F 40/295* (2020.01); *G06N 5/04* (2013.01); *G06N 20/00* (2019.01); *G10L 15/1815* (2013.01); *G10L 15/22* (2013.01); *G10L 2015/223* (2013.01)

(58) Field of Classification Search
CPC .... G06F 40/268; G06F 40/284; G06F 40/295; G06F 40/30; G06F 16/3329; G06F 16/3344; G06F 16/90332; G06N 5/04; G06N 20/00; G10L 15/1815; G10L 15/22; G10L 2015/223

See application file for complete search history.

(56) References Cited

U.S. PATENT DOCUMENTS

| | | | |
|---|---|---|---|
| 9,092,988 B2 * | 7/2015 | Agarwal | ................. G06N 5/02 |
| 9,720,981 B1 | 8/2017 | Boguraev et al. | |

(Continued)

FOREIGN PATENT DOCUMENTS

| | | |
|---|---|---|
| KR | 10-2005-0032937 A | 4/2005 |
| KR | 10-2012-0061133 A | 6/2012 |
| KR | 10-1851787 B1 | 4/2018 |

OTHER PUBLICATIONS

P. Molino, P. Basile, A. Caputo, P. Lops and G. Semeraro, "Exploiting Distributional Semantic Models in Question Answering,", 2012, 2012 IEEE Sixth International Conference on Semantic Computing, pp. 146-153, doi: 10.1109/ICSC.2012.53. (Year: 2012).*

(Continued)

*Primary Examiner* — Eric Yen

(57) ABSTRACT

A machine reading comprehension (MRC) question and answer providing method includes receiving a user question; analyzing the user question; selecting at least one document from at least one domain corresponding to an analyzed user question and searching for a passage, which is a candidate answer determined as being suitable for the user question, in the selected at least one document; obtaining at least one correct answer candidate value by inputting the user question and a corresponding passage into each of at least one MRC question and answer unit; and determining whether the at least one correct answer candidate value is a best answer.

6 Claims, 10 Drawing Sheets

(51) Int. Cl.
  *G10L 15/22* (2006.01)
  *G10L 15/18* (2013.01)

(56) References Cited

U.S. PATENT DOCUMENTS

| | | | |
|---|---|---|---|
| 10,365,847 B1* | 7/2019 | Miloslavsky | G06F 3/0637 |
| 2002/0169595 A1* | 11/2002 | Agichtein | G06F 40/211 |
| | | | 704/9 |
| 2004/0133557 A1* | 7/2004 | Wen | G06F 16/338 |
| 2004/0254917 A1* | 12/2004 | Brill | G06F 16/3329 |
| 2006/0041597 A1* | 2/2006 | Conrad | G06F 16/30 |
| 2006/0206472 A1 | 9/2006 | Masuichi et al. | |
| 2007/0050351 A1* | 3/2007 | Kasperski | G06F 16/951 |
| 2007/0156753 A1* | 7/2007 | Bourland, II | G06F 16/29 |
| 2008/0215541 A1* | 9/2008 | Li | G06F 16/951 |
| 2009/0287678 A1* | 11/2009 | Brown | G06F 16/334 |
| 2010/0299314 A1* | 11/2010 | Sengupta | G06Q 10/06311 |
| | | | 707/687 |
| 2011/0257961 A1* | 10/2011 | Tinkler | G09B 7/06 |
| | | | 704/9 |
| 2012/0078895 A1* | 3/2012 | Chu-Carroll | G06F 16/332 |
| | | | 707/E17.014 |
| 2012/0101807 A1* | 4/2012 | Heo | G06F 16/3331 |
| | | | 704/9 |
| 2012/0303358 A1* | 11/2012 | Ducatel | G06F 16/30 |
| | | | 704/9 |
| 2014/0172883 A1* | 6/2014 | Clark | G06N 20/00 |
| | | | 707/749 |
| 2015/0347557 A1* | 12/2015 | Allen | G06F 16/285 |
| | | | 707/738 |
| 2016/0125751 A1* | 5/2016 | Barker | G06F 16/3332 |
| | | | 434/322 |
| 2016/0140958 A1* | 5/2016 | Heo | G06F 40/30 |
| | | | 704/9 |
| 2018/0060304 A1* | 3/2018 | Bull | G06F 40/211 |
| 2018/0068225 A1* | 3/2018 | Miyoshi | G06F 16/90335 |
| 2018/0089307 A1* | 3/2018 | Cohen | G06F 16/93 |
| 2018/0113867 A1* | 4/2018 | Erpenbach | G06F 16/243 |
| 2018/0246953 A1* | 8/2018 | Oh | G06N 5/003 |
| 2019/0065576 A1* | 2/2019 | Peng | G06F 16/22 |
| 2019/0325864 A1* | 10/2019 | Anders | G06F 40/35 |
| 2019/0354630 A1* | 11/2019 | Guo | G10L 15/22 |
| 2020/0356556 A1* | 11/2020 | Tang | G06F 16/248 |
| 2021/0004673 A1* | 1/2021 | Boxwell | G06N 3/0427 |
| 2021/0082402 A1* | 3/2021 | Sun | G10L 15/1807 |

OTHER PUBLICATIONS

Wikipedia, Question Answering, pp. 1-7, retrieved on Mar. 31, 2020, available at https://en.wikipedia.org/w/index.php?title=Question_answering&oldid=925874509.

Lin et al., Question Answering from the Web Using Knowledge Annotation and Knowledge Mining Techniques, International Conference on Information Knowledge Management, pp. 116-123, Nov. 3, 2003, New York, NY.

Extended European Search Report for European Application No. 19209403.5, dated Apr. 15, 2020.

* cited by examiner

DEVICE AND METHOD FOR MACHINE READING COMPREHENSION QUESTION AND ANSWER

BACKGROUND

1. Field

One or more embodiments relate to a machine reading comprehension question and answer.

2. Description of Related Art

Human languages are rich, complex, and contain many vocabularies with complex grammar and contextual meanings, but hardware or software applications generally require data to be entered in accordance with certain formats or rules. Here, natural language input is able to be used in almost any software application for interacting with a person. Recently, in a question and answer providing method using natural language, a natural language processor (NLP) module receives a lexical input in the form of a text or a speech and processes the lexical input into a form that can be processed on a computer, a processed lexical input passes through a context analyzer for analyzing the context of the processed natural language, answers are classified and finalized by a decision maker that determines an answer according to the context, and a lexical output is output through a response generator for providing an answer to a user according to the finalized answer.

PRIOR ART DOCUMENTS

Patent Documents

KR 10-1851787 B1

SUMMARY

One or more embodiments are to provide a best answer that is most suitable for a user question input in natural language.

One or more embodiments include a method of using at least one passage, document, and a machine reading and comprehension (MRC) question and answer algorithm.

Additional aspects will be set forth in part in the description which follows and, in part, will be apparent from the description, or may be learned by practice of the presented embodiments of the disclosure.

According to one or more embodiments, a machine reading comprehension (MRC) question and answer providing method includes receiving a user question in the form of a speech or a text, analyzing an intention of the user question by analyzing lexical meanings based on an entity name recognized through a morphological analysis of the user question, extracting a query by restoring an abbreviation or a substitute word, and mapping at least one domain information corresponding to the query based on a rule-based domain classifier, selecting a similar question word candidate group, selecting one similar question word having a high similarity from the similar question word candidate group by applying word embedding, and, when there is a best answer value corresponding to the selected similar question word, providing the existing best answer value as an answer to the user; when there is no best answer value corresponding to the similar question word, selecting at least one document corresponding to the question based on the at least one mapped domain information; searching for a plurality of passages sentence by sentence in the at least one document and applying at least one MRC question and answer algorithm to the plurality of retrieved passages; and, after applying the at least one MRC question and answer algorithm to the plurality of passages, selecting one best answer value based on reliability of the at least one MRC question and answer algorithm or consistency of result values and providing the best answer value as an answer to a user, or, when there is no best answer value, providing information indicating no result as an answer to the user.

According to one or more embodiments, a machine reading comprehension (MRC) question and answer providing method includes receiving a user question; analyzing the user question; selecting at least one document from at least one domain corresponding to an analyzed user question and searches for a passage, which is a candidate answer determined as being suitable for the user question, in the selected at least one document; obtaining at least one correct answer candidate value by inputting the user question and a corresponding passage into each of at least one MRC question and answer unit; determining whether the at least one correct answer candidate value is a best answer; and providing a best answer value, which is a correct answer candidate value determined as a correct answer, or information indicating no result as an answer to a user.

According to one or more embodiments, a machine reading comprehension (MRC) question and answer providing method includes receiving a user question in the form of a speech or a text; analyzing a user question based on a natural language processing analysis and a natural language comprehension analysis; during the analysis of the user question, when a similar question word candidate group is selected, a term frequency-inverse document frequency (TF-IDF) value is calculated with respect to the similar question word candidate group, one similar question word corresponding to a high TF-IDF value is selected, and there is a best answer value corresponding to the selected similar question word, providing the existing best answer value as an answer to the user; when there is no best answer value corresponding to the similar question word, selecting a plurality of documents in at least one domain corresponding to the user question and extracting a plurality of passages that are answer candidates determined as being suitable for the user question from the selected plurality of documents; applying a plurality of MRC question and answer algorithms are applied to the plurality of passages to obtain a plurality of correct answer candidate values; and determining whether there is a best answer value that is determined to be a correct answer from among the plurality of correct answer candidate values and, when there is a best answer value, providing the best answer value as an answer, and when there is no best answer value, providing information indicating no result as an answer to a user.

According to one or more embodiments, a machine reading comprehension (MRC) question and answer providing device includes a receiver configured to receive a user question; an analyzer configured to analyze the user question; a passage searcher configured to select at least one document from at least one domain corresponding to an analyzed user question and searches for a passage, which is a candidate answer determined as being suitable for the user question, in the selected at least one document; a MRC question and answer unit configured to output at least one correct answer candidate value by receiving inputs of the user question and a corresponding passage and applying at least one MRC question and answer algorithm; a screener configured to determine whether the at least one correct answer candidate value is a best answer; and an answer unit configured to provide a best answer value, which is a correct answer candidate value determined as a correct answer, or information indicating no result as an answer to a user.

According to one or more embodiments, a machine reading comprehension (MRC) question and answer providing device includes a receiver configured to receive a user question in the form of a speech or a text; an analyzer configured to analyze a user question based on a natural language processing analysis and a natural language comprehension analysis; a similar question matching unit configured to, during the analysis of the user question, select a similar question word candidate group, calculate a term frequency-inverse document frequency (TF-IDF) value with respect to the similar question word candidate group, select one similar question word corresponding to a high TF-IDF value, and, when there is a best answer value corresponding to the selected similar question word, provide the existing best answer value as an answer to the user; a passage searcher configured to, when there is no best answer value corresponding to the similar question word, select a plurality of documents in at least one domain corresponding to the user question and extract a plurality of passages that are answer candidates determined as being suitable for the user question from the selected plurality of documents; a MRC question and answer unit configured to apply a plurality of MRC question and answer algorithms to the plurality of passages to obtain a plurality of correct answer candidate values; and a screener configured to determine whether there is a best answer value that is determined to be a correct answer from among the plurality of correct answer candidate values; and, an answer unit configured to, when there is a best answer value, provide the best answer value as an answer, and when there is no best answer value, provide information indicating no result as an answer to a user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF EMBODIMENTS

Figure 1:
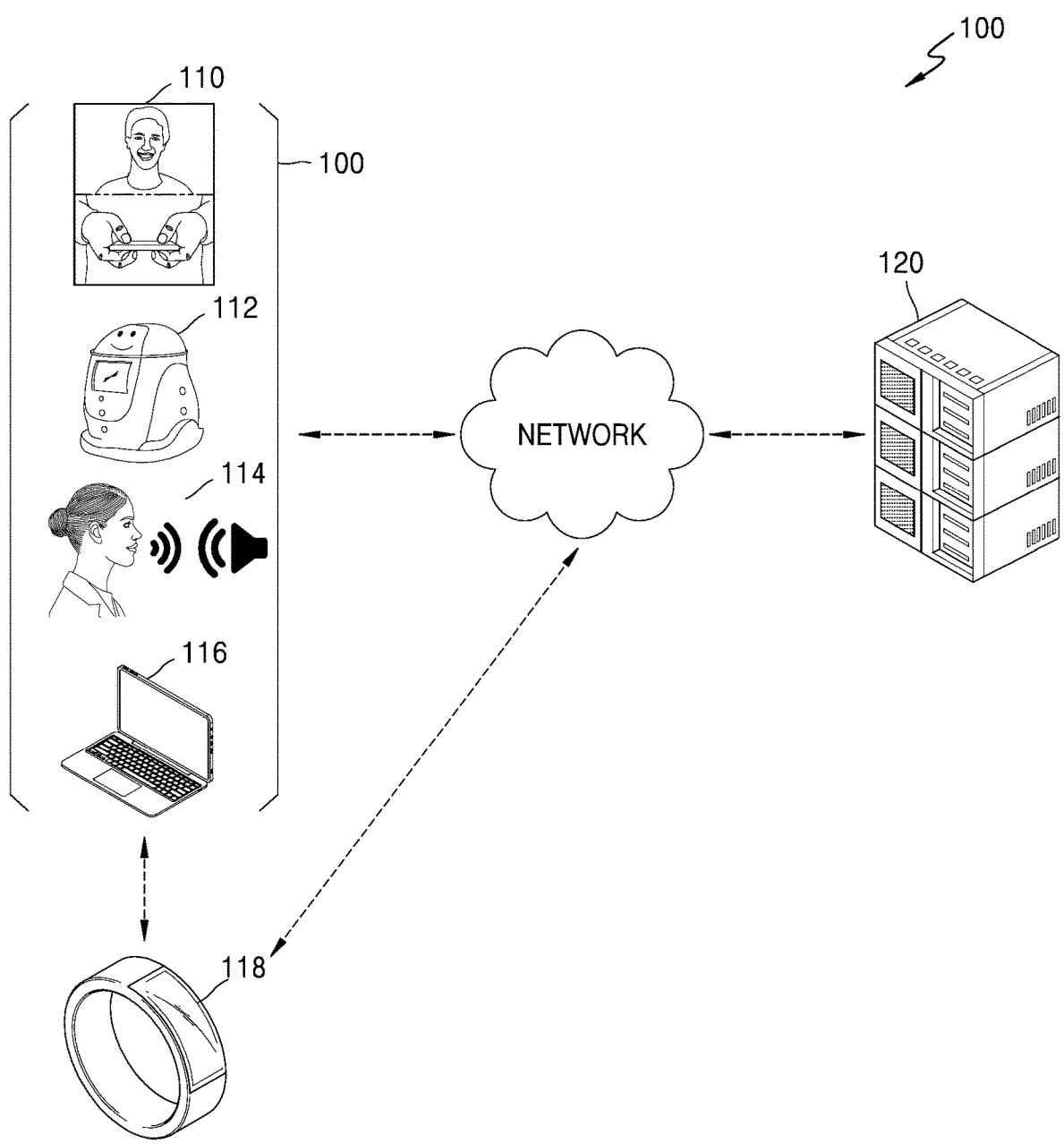
FIG. 1 is a system diagram showing the operation of a device on which a method of providing machine reading comprehension (MRC) question and answer is implemented according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a system diagram showing the operation of a device on which a method of providing machine reading comprehension (MRC) question and answer is implemented according to an embodiment.

According to an embodiment, a device of which a method of providing MRC question and answer is implemented includes a terminal, a smart phone, a smart TV, an artificial intelligence (AI) speaker 114, a laptop computer, a tablet computer, a wearable device 118, a handheld device 110, and an AI robot 112 and further includes a server 120. The device on which the method of providing MRC question and answer is implemented also includes both a memory having stored therein a machine learning algorithm library and a natural language processing and comprehending algorithm library and a processor for processing corresponding libraries.

Figure 2:
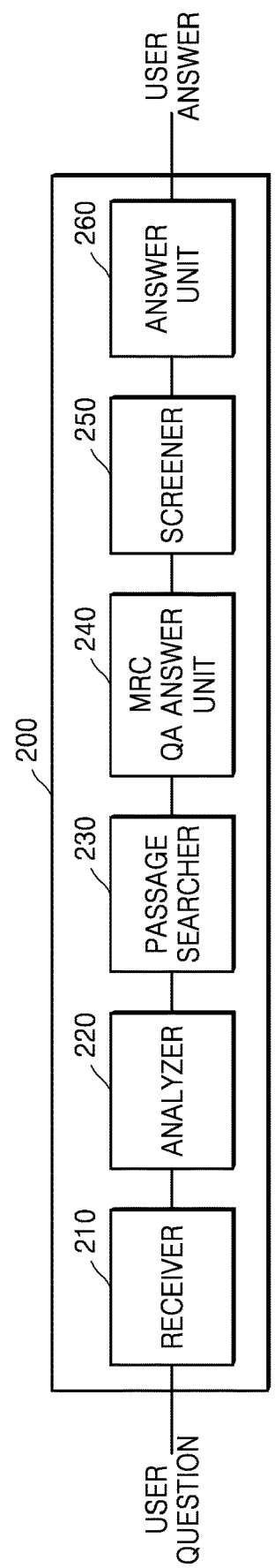
FIGS. 2 and 3 are schematic diagrams of MRC question and answer providing devices according to embodiments.
Figure 3:
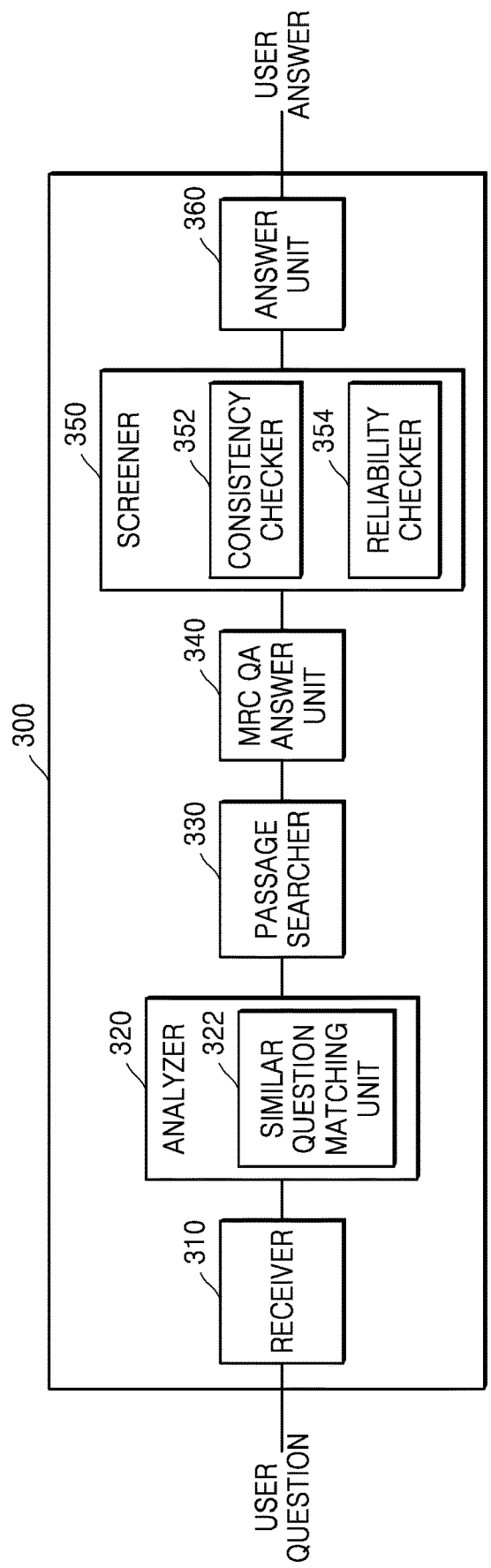

FIGS. 2 and 3 are schematic diagrams of MRC question and answer providing devices according to embodiments. Like reference numerals in the drawings denote the same or similar elements throughout the several aspects.

FIG. 2 is a schematic diagram of an MRC question and answer providing device 200 according to an embodiment.

The MRC question and answer providing device 200 may include a receiver 210, an analyzer 220, a passage searcher 230, an MRC question and answer unit 240, a screener 250, and an answer unit 260 and may further include an administrator setting unit (not shown).

Figure 5:
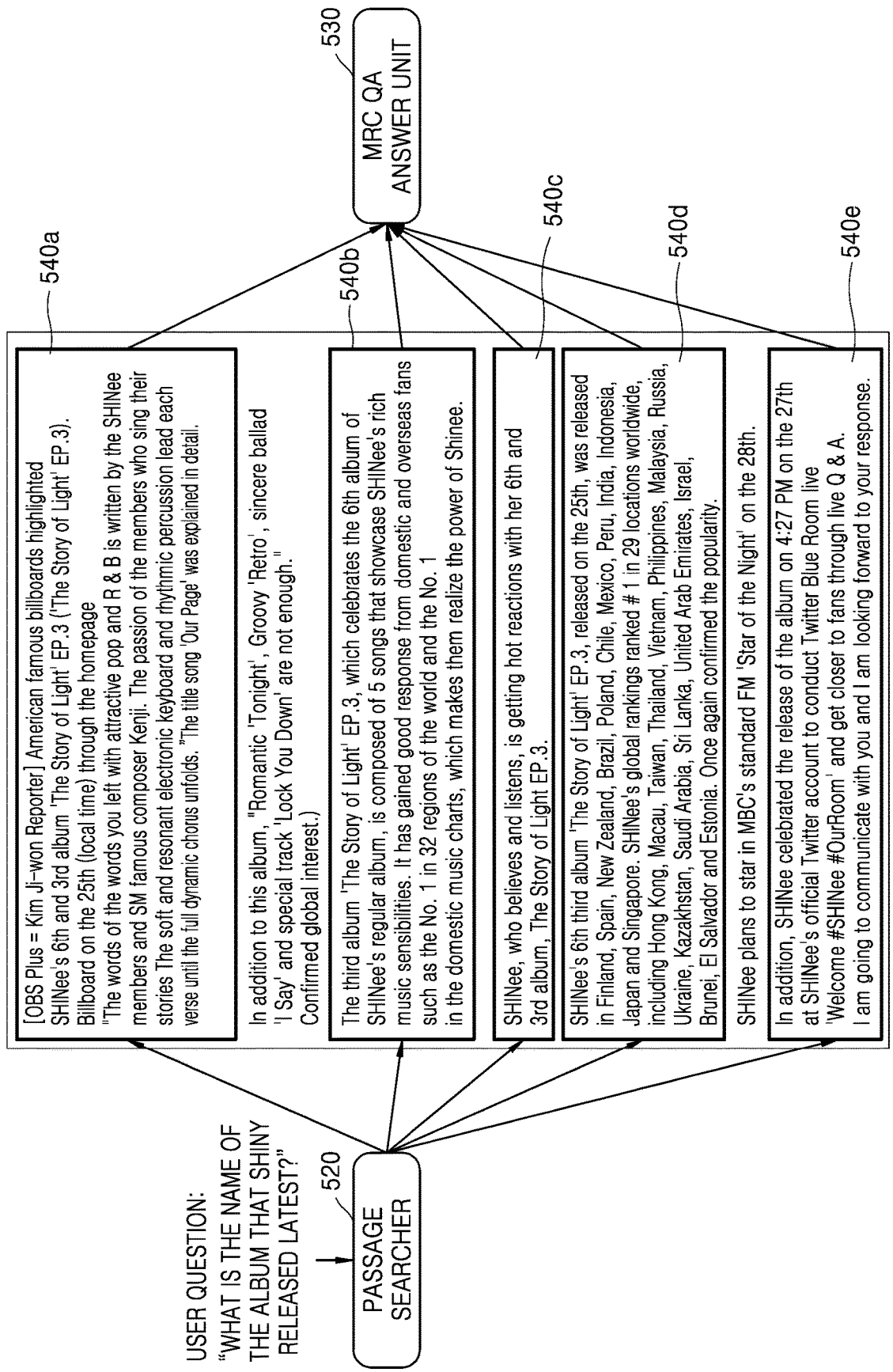
FIG. 5 is a diagram showing an example that a passage searcher searches for a passage and provides a retrieved passage to an MRC question and answer unit.

The receiver 210 receives a user question, the analyzer 220 analyzes the user question, the passage searcher 230 selects at least one document from at least one domain corresponding to the analyzed user question, and a passage, which is a candidate answer determined as being suitable for the user question, is searched for in the at least one selected document. In this case, N passages (N is a natural number) may be retrieved. An example of searching for a passage is shown in FIG. 5.

Figure 4:
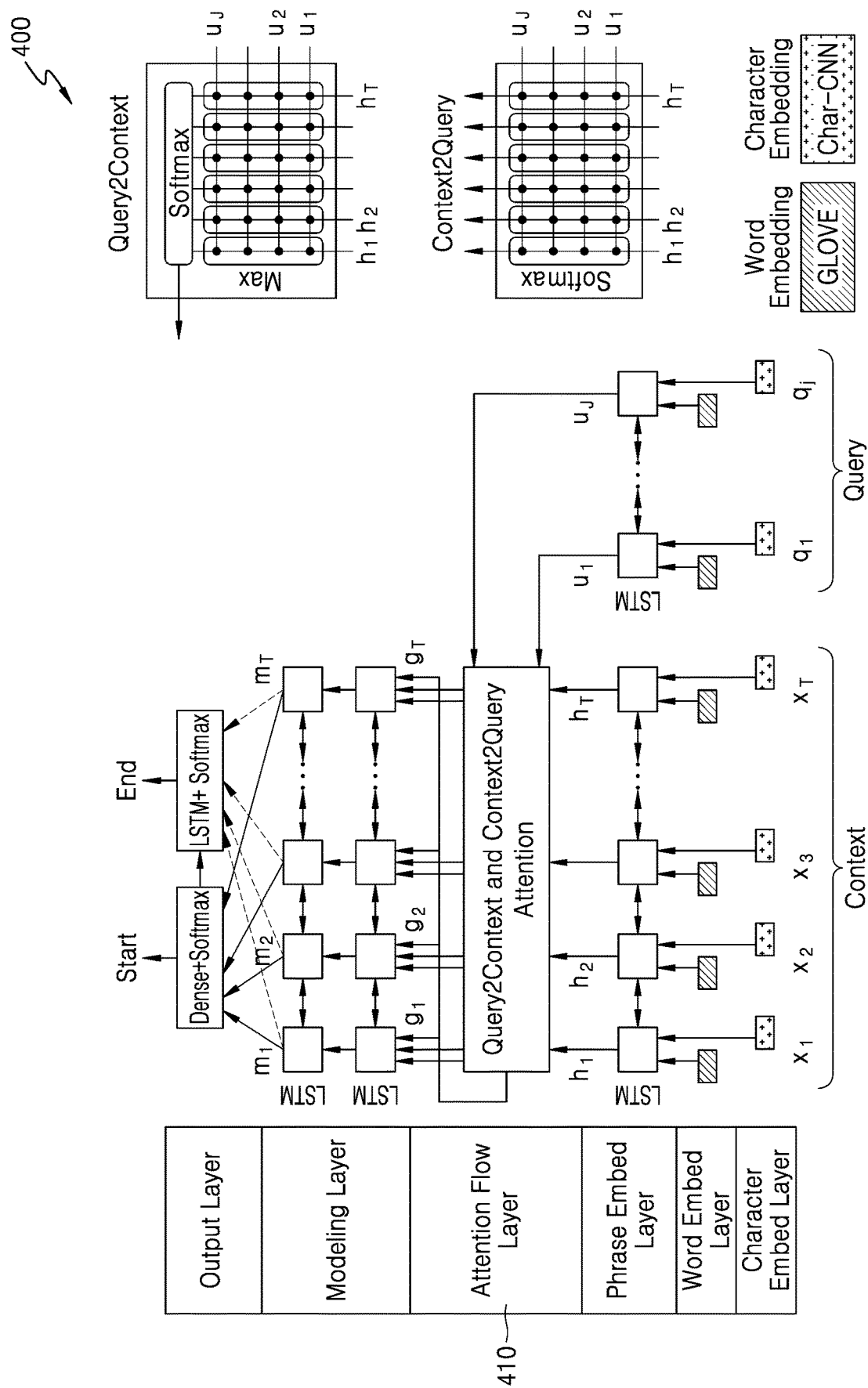
FIG. 4 is a schematic diagram of an MRC question and answer algorithm according to an embodiment.

Each of at least one MRC question and answer unit 240 receives a user question and a set of N passages corresponding to the user question as inputs and obtains N*M correct answer candidate values by applying M (M is a natural number) MRC algorithms to each of the N passages. An example of characteristics of an MRC algorithm is shown in FIG. 4.

The screener 250 determines a best answer value from among the N*M correct answer candidate values. The answer unit 260 transmits the best answer value determined by the screener 250 or information indicating that there is no result corresponding to the user question to a user in the form of answer information.

FIG. 3 is a schematic diagram of an MRC question and answer providing device 300 according to another embodiment.

The MRC question and answer providing device 300 may include a receiver 310, an analyzer 320, a passage searcher 330, an MRC question and answer unit 340, a screener 350, and an answer unit 360 and may further include an administrator setting unit (not shown). The analyzer 320 further includes a similar question matching unit 322. The screener 350 further includes a consistency checker 352 and a reliability checker 354.

The administrator setting unit stores a best answer value determined by the screener 350 as a semantic triple and manages settings of the similar question matching unit 332, the passage searcher 330, and the MRC question and answer unit 340. Also, the administrator setting unit may store all information generated by the receiver 310, the analyzer 320, the passage searcher 330, the MRC question and answer unit 340, the screener 350, and the answer unit 360. Examples of all the information include system logs, a plurality of passages, a plurality of correct answer candidate values, the reliability of each of the correct answer candidate values, a used MRC question and answer algorithm, a passage retrieval result, a passage retrieval time, and whether a correct answer is determined by the screener 350.

The receiver 310 may receive a user question in the form of a speech or a text. The reception of a user question includes both a case where a person asks a question by using a natural language-based sentence through a speech recognition speaker or a case where a person asks a question by typing through a chatbot. When a speech is recognized through a speech recognition speaker, the receiver 310 converts the voice into a text through a speech-to-text (STT) conversion. For example, when a user is a fan of the singer 'Shiny', the receiver 310 may receive a question "what is the name of the album that Shiny released this time?"

The analyzer 320 receives a user question in the form of a text through the receiver 310 and then analyzes the user question through natural language processing and natural language comprehension. The analyzer 320 may analyze the user question based on a morphological analysis, recognize the entity name, analyze a lexical meaning based on the recognized entity name, analyze the intention of the user question, extract a query by restoring an abbreviation or a substitute word, and map at least one domain information corresponding to the query based on a rule-based domain classifier. According to an embodiment, at least one domain information corresponding to a query refers to a pre-written domain-specific document.

During a natural language comprehension process, the analyzer 320 analyzes which domain the user question belongs to and what the core content of the user question is and transmits a result of the analysis to the passage searcher 330. For example, for the question "what is the name of the album that Shiny released this time?" received by the receiver 310, the analyzer 320 maps the question to domains "music" and "person". In this case, the user question may be considered as not being directly related to domains "movie" and "economy". In this case, the passage searcher 330, which received a result of an analysis, may search for the user question in domains related to "music" and "person" and excludes domains like "movie" and "economy", thereby improving the searching speed and the accuracy of documents. Also, the analyzer 320 recognizes "Shiny", "this time", and "album name" as entity names or key words based on a morphological analysis.

When the analyzer 320 analyzes a user question by using deep learning technology, the similar question matching unit 322 selects a similar question word candidate group, selects one similar question word with high similarity by applying word-embedding to the similar question word candidate group, and, when a best answer value corresponding to the similar question word already exists, provides the existing best answer value to a user as an answer.

For example, the similar question matching unit 322 may apply word-embedding to the question "What is the name of the album that Shiny released latest?" and select a similar question "Tell me the name of Shiny's latest album" having a similar meaning. When a best answer value "'The Story of Light' EP3" for the similar question "Tell me the name of Shiny's latest album" already exists, the similar question matching unit 322 may replace the user question "What is the name of the album that Shiny released latest?" to "Tell me the name of Shiny's latest album", which is a representative question with high similarity, and provide the existing best answer value as an answer to the user question.

The passage searcher 330 selects at least one document from at least one domain corresponding to an analyzed user question and searches for a passage, which is a candidate answer determined as being suitable for the user question, in the selected at least one document. In this case, the at least one document includes news articles, dictionaries, and web documents such as blogs. FIG. 5 is a diagram showing an example that a passage searcher searches for a passage and provides a retrieved passage to an MRC question and answer unit. Referring to FIG. 5, an example in which the passage searcher 520 extracts five passages 540a, 540b, 540c, 540d, and 540e in relation to a user question "What is the name of the album that Shiny released latest?" and transmits the passages 540a, 540b, 540c, 540d, and 540e to the MRC question and answer unit 340 is shown.

The passage searcher 330 may use key words "Shiny", "this time", and "album name", which are recognized by the analyzer 320 in domains related to "music" and "person", to search for passages.

The passage searcher 330 utilizes a term frequency-inverse document frequency (TF-IDF) and searches for N passages in at least one document in the descending order of TF-IDF values. In this case, N passages may be extracted from one document or N passages may be extracted from a plurality of documents. According to an embodiment, the passage searcher 330 may extract at least one passage in the descending order of TF-IDF values having values equal to or greater than a predetermined score.

The TF-IDF is a weight used for information retrieval and text mining and is a statistical value that indicates how important a word is within a particular document when there are groups of documents. The TF-IDF may be used to extract key words of a document, to determine rankings of search results in a search engine, or to determine similarity between documents.

A term frequency (TF) is a value that indicates how often a particular word appears within a document. The higher the TF is, the more important the document may be considered as being. However, when a word is frequently used in a group of documents, it means that the word is common. A frequency that the word is used is referred to as a document frequency (DF), and the inverse thereof is called inverse document frequency (IDF). A TF-IDF is the product of a TF and an IDF.

An IDF value depends on the background of a document group. For example, the word "atoms" may have a high IDF value and become a key word in documents because the word does not frequently appear in ordinary documents. However, the word becomes a frequently used word in a group of documents related to atoms, and thus other words that may be used to classify and distinguish the documents receive high weights.

According to an embodiment, the passage searcher 330 calculates a TF-IDF value based on a user question, a query analyzed from the user question, and a result of a morphological analysis of the query. In this case, the number of passages extracted by the passage searcher 330 may be initially set to an arbitrary number and may be automatically adjusted later by using log-based statistical values. The log-based statistical values include a result value selected as the best answer by the screener 350 and a log analysis value recorded in the administrator setting unit.

For example, when the administrator setting unit initially sets the passage searcher 330 to extract five passages and an actual result is not significantly different from that of a case of extracting three passages, the passage searcher 330 is automatically adjusted to extract three passages, and thus search speed and efficiency may be improved.

According to an embodiment, the passage searcher 330 may also set an extraction range for extracting passages. The administrator setting unit may initially set the passage searcher 330 to extract passages in units of sentences exceeding a predetermined byte. For example, the administrator setting unit may initially set the passage searcher 330 to extract a passage within the range from 500 bytes to 800 bytes including Korean characters and spaces. A passage is extracted sentence by sentence according to periods. For example, to extract a passage sentence by sentence, the passage is extracted sentence by sentence including periods, even when the passage exceeds 800 bytes.

The passage searcher 330 may automatically adjust an extraction range for extracting a passage based on the statistics that correct answer candidate values determined by the MRC question and answer algorithm used by each of at least one MRC question and answer unit 340 are determined as best answers. For example, when the initial setting was made to extract passages within the range from 500 bytes to 800 bytes and the statistics of the byte values of passages determined as best answers in the screener 350 is from 600 to 630 bytes, the administrator setting unit may feedback this value to the passage searcher 330 and adjust the extraction range for extracting passages to from 600 to 630 bytes.

According to an embodiment, the MRC question and answer device 300 includes one or a plurality of MRC question and answer units 340, wherein each MRC question and answer unit 340 is implemented to apply an MRC question and answer algorithm to passages.

FIG. 4 is a diagram showing an implementation example of an MRC question and answer algorithm 400. The MRC question and answer algorithm refers to an algorithm that a machine comprehends a user question including natural language and automatically reads and derives an answer from passages including an answer corresponding to the user question. The MRC question and answer algorithm is implemented based on a recurrent neural network (RNN) based attention model 410 to repeatedly read documents to search for a correct answer and select a proposal, a user question, and a correct answer as a group of knowledge base candidates. Examples of the MRC question and answer algorithms include neural network algorithms, such as an R-Net, a BiDAF, and a ReasoNet model.

According to an embodiment, the MRC question and answer unit 340 generates N*M correct answer candidate values by applying M MRC question and answer algorithms to N passages corresponding to one user question and transmits the N*M correct answer candidate values and reliability information indicating the probability of being a correct answer for each of the N*M correct answer candidate values to the screener 350. For example, when three passages are extracted for one user question and three MRC question answering algorithms are applied, a total of nine correct answer candidate values are derived. The MRC question and answer unit 340 transmits the nine correct answer candidate values and reliability information indicating the probability of being a correct answer for each of the nine correct answer candidate values to the screener 350.

The screener 350 determines one best answer according to a criterion pre-set from among the correct answer candidate values for the user question. The method of determining the best answer in the screener 350 is described in detail with reference to FIG. 6.

When there are a plurality of correct answer candidate values, the screener 350 first checks whether the majority of or at least a certain percentage of the plurality of correct answer candidate values are consistent through the consistency checker 352 (operation S630). To this end, the consistency checker 352 may perform pre-processing operations for analyzing at least one correct answer candidate value for periods, spacing, and case sensitivity on the basis of morphological analysis, unifying the formats of the at least one correct answer candidate values according to pre-set criteria, and also restoring abbreviations or substitute terms. When the majority of or at least a certain percentage of the plurality of correct answer candidate values are consistent, the consistency checker 352 selects the corresponding correct answer candidate values as best answers (operation S632).

For example, when there are nine correct answer candidate values for the question "What is the name of the album that Shiny released latest?" and five or more correct answer candidate values including 'the story of light ep3, 'The Story of Light EP3', THE STORY OF LIGHT', etc. consistently indicate 'The Story of Light EP3', the correct answer candidate value 'The Story of Light EP3' is selected as the best answer.

When a best answer is not selected by the consistency checker 352, the screener 350 determines whether there is a correct answer candidate value corresponding to a reliability exceeding a pre-set critical value (e.g., 90%) through the reliability checker 354 (operation S640). When there is a correct answer candidate value corresponding to a reliability (e.g., 95%) exceeding the preset critical value, the corresponding correct answer candidate value is determined as the best answer. In this case, when the reliability of a plurality of correct answer candidate values exceeds the preset critical value, the correct answer candidate value corresponding to the highest reliability value is determined as the best answer (operation S642).

When the screener 350 is unable to find a best answer value through the consistency checker 352 and the reliability checker 354, the screener 350 determines whether the critical value of the reliability of the correct answer candidate values is less than a preset reference value (operation S650) and, when the reliability of all of the correct answer candidate values is less than the critical value, transmits 'no result' to the answer unit 360 (operation S652).

When the screener 350 is unable to find a best answer value through the consistency checker 352 and the reliability checker 354 and the reliability of correct answer candidate values is equal to or greater than a first critical value and less than a second critical value, the screener 350 classifies the correct answer candidate values according to similarity of meanings based on a word-embedding value scheme, determines whether the majority of or at least a pre-set percentage of the correct answer candidate values classified by meanings have the same value, and, when the majority of or at least a pre-set percentage of the correct answer candidate values classified by meanings have the same value, selects the corresponding value as a best answer (operation S660).

When the majority of or at least a pre-set percentage of the correct answer candidate values classified by meanings do not have the same value, the screener 350 transmits 'no result' to the answer unit 360.

For example, 'The Story of Light EP3', 'The Story of Light EP3', and 'The Story of Light Third EP' are semantically the same, but a result may vary depending on which passage is extracted. For such a case, the similarity between result values is measured through similar question word matching trained in advance and, when the similarity is equal to or higher than a particular similarity, correct answer candidate values are determined as the same values.

The answer unit 360 provides a best answer or information indicating no result transmitted from the screener 350 to a user as an answer.

Figure 6:
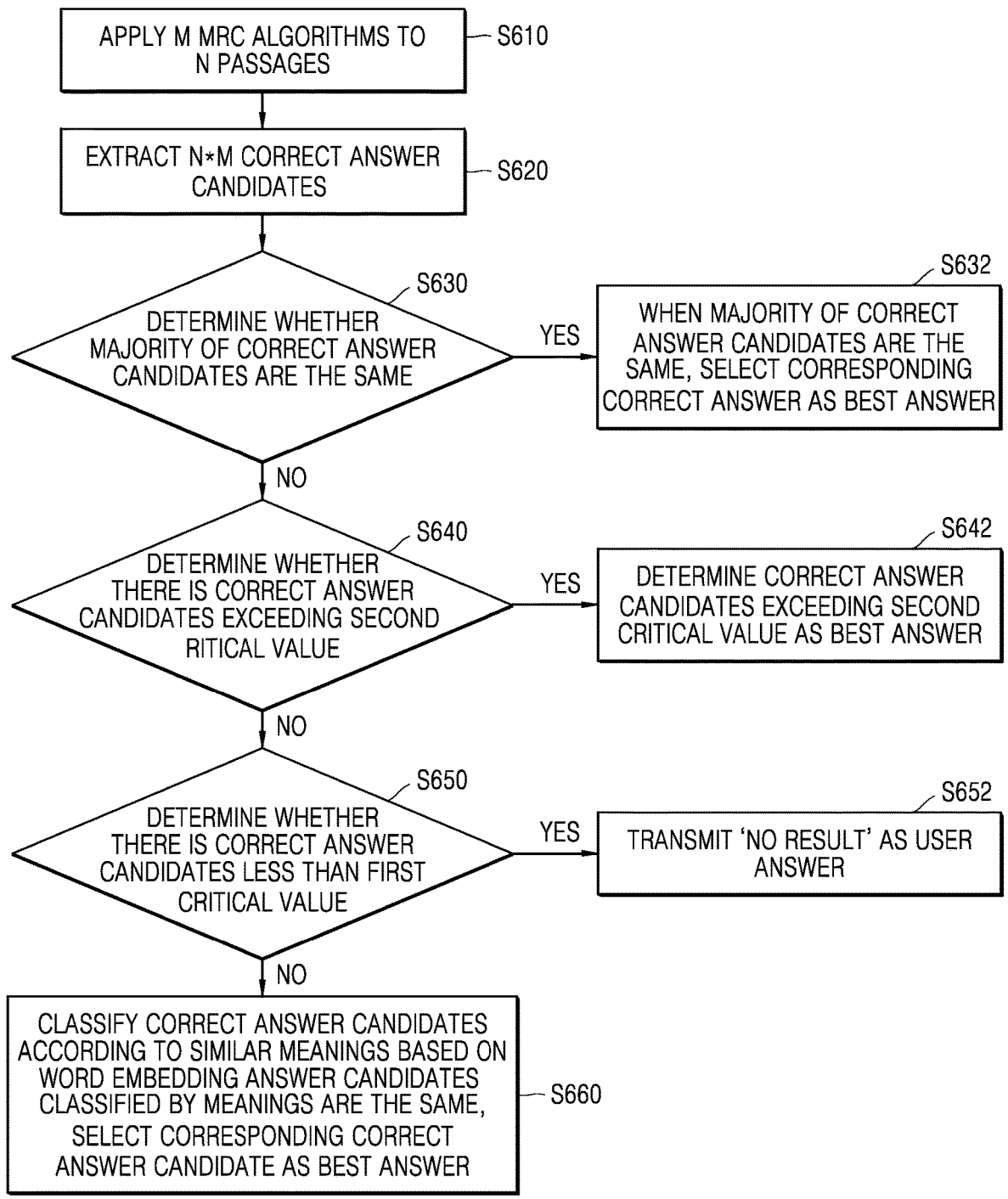
FIG. 6 is a flowchart showing a process for determining a best answer in a screener according to an embodiment.

FIG. 6 is a flowchart showing a process for determining a best answer in a screener according to an embodiment.

According to an embodiment, the screener receives N*M correct answer candidate values extracted by applying M MRC algorithms to N passages (operations S610 and S620) and determines whether the majority of the received correct answer candidate values are the same (operation S630). When the majority of the correct answer candidate values are substantially the same, the corresponding correct answer candidate value is selected as a best answer value (operation S632). When the majority of the received correct answer candidate values are not the same, it is determined whether there is a correct answer candidate value corresponding to reliability exceeds a preset critical value (operation S640). When there is a correct answer candidate value corresponding to reliability exceeds the preset critical value, the corresponding correct answer candidate value is selected as a best answer value (operation S642).

When there is no correct answer candidate value corresponding to a reliability exceeding the preset critical value, it is determined whether all of the correct answer candidate values are less than another preset critical value and, when all of the correct answer candidate values are less than the other preset critical value, transmits 'no result' as an answer to a user (operation S652).

When the reliability of correct answer candidate values is between the first threshold value and the second threshold value, the correct answer candidate values are classified according to similarity of meanings based on a word-embedding value scheme and, when the majority of the correct answer candidate values classified by meanings have the same value, the corresponding value is selected as a best answer (operation S660).

Figure 7:
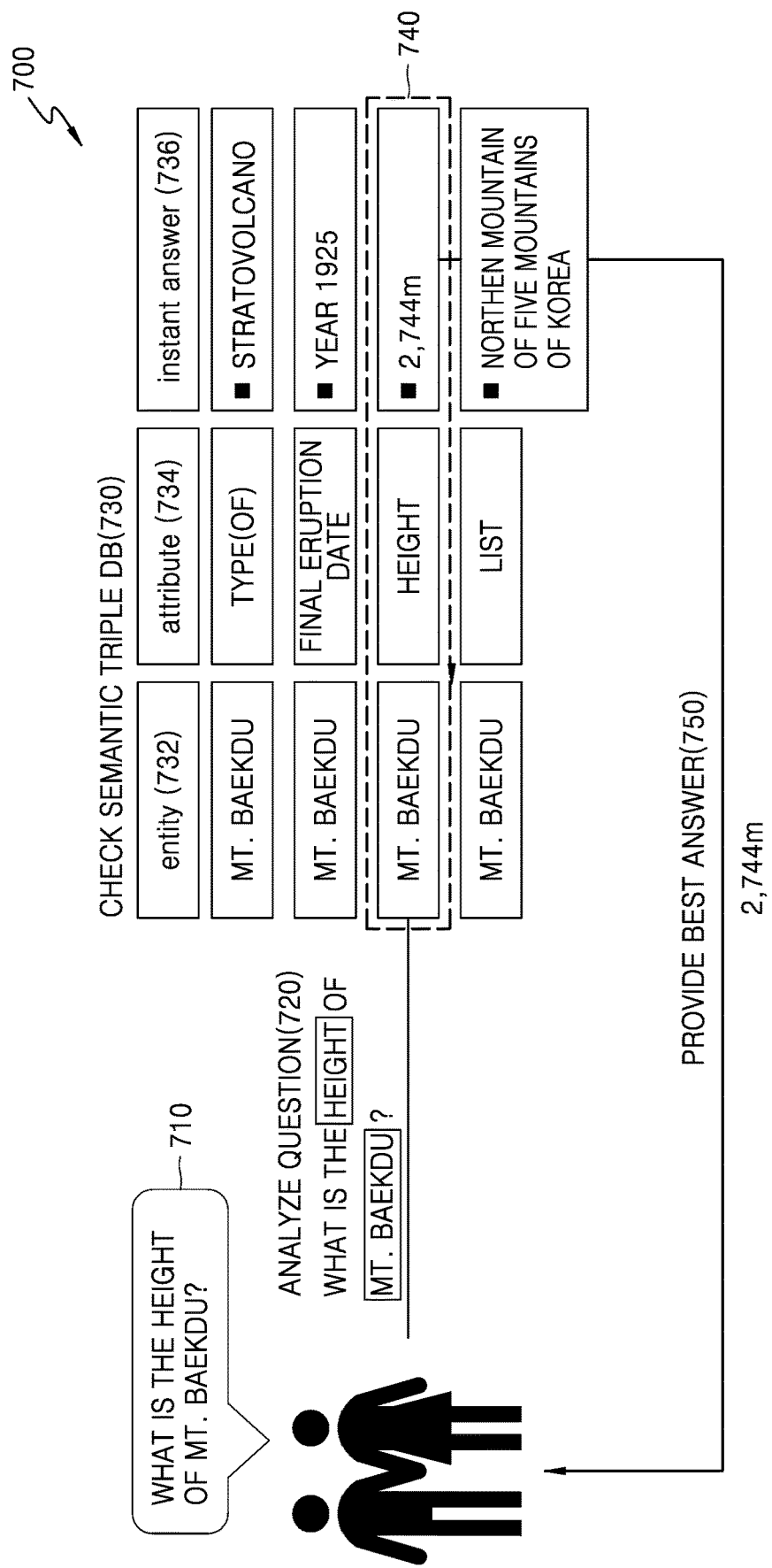
FIG. 7 is a diagram showing an example of performing a semantic triple-based search according to an embodiment.

FIG. 7 is a diagram showing an example of performing a semantic triple-based search according to an embodiment.

According to an embodiment, the administrator setting unit stores a best answer value determined by a screener based on the semantic triple. A semantic triple database is a particular type of knowledge-based database that simulates queries of actual users and a best answer may be searched for without any additional reasoning. The semantic triple database has the form of entity 732-attribute 734-instant answer 738.

In FIG. 7, when a user question 710 "What is the height of Mt. Baekdu?" Is received, key words "Mt. Baekdu" and "height" may be extracted and "Mt. Baekdu" may be analyzed as an entity of the user question 710 and "height" may be analyzed as an intention of the user question 710.

The administrator setting unit checks a semantic triple database (DB) 730, searches for data with entity="baekdusan" and attribute="height", determines an instant answer of the corresponding items as a result, and provides a corresponding answer 750 of 2,744 m to a user.

The administrator setting unit checks the forms of the user question and the best answer to store a best answer value determined by the screener based on the semantic triple. In this case, a question transformation process includes a natural language comprehension technique and a semantic triple entity/attribute data retrieval technique.

Figure 8:
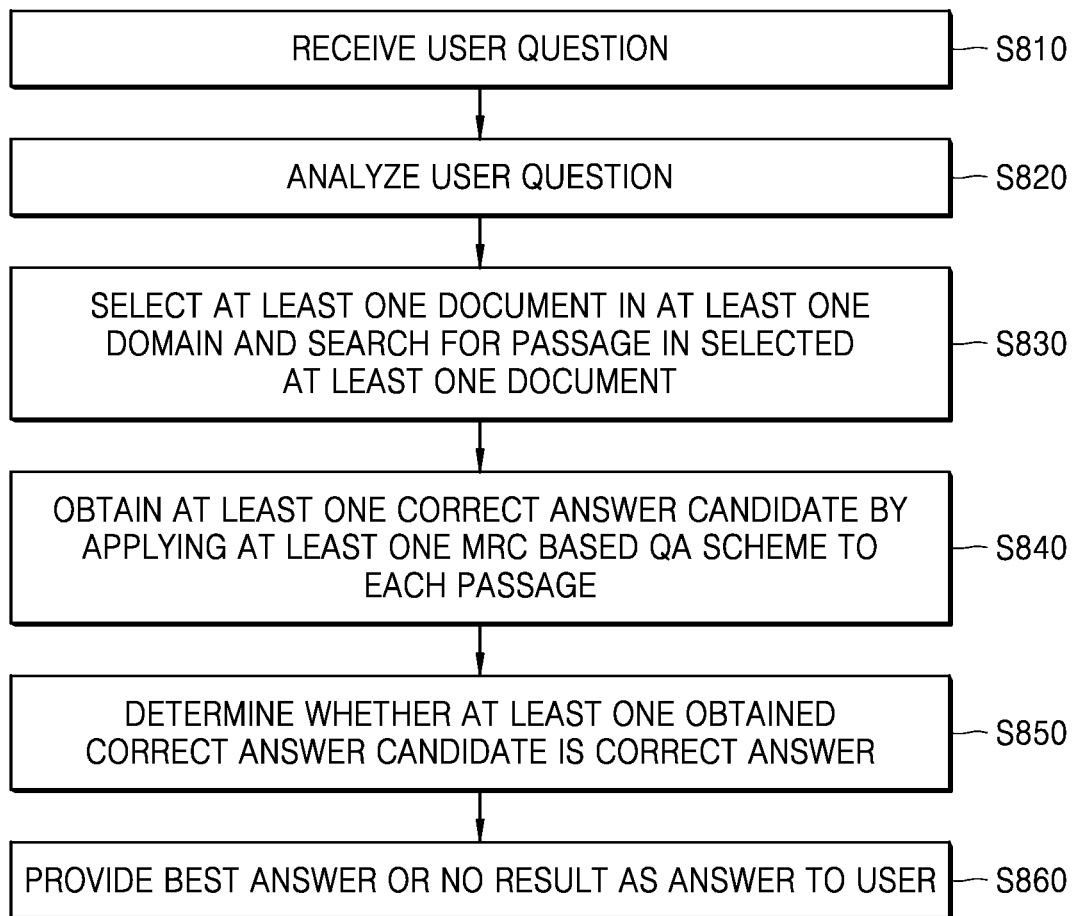
FIGS. 8 to 10 are flowcharts of methods of providing MRC question and answer according to embodiments.

FIG. 8 is a flowchart of a method of providing MRC question and answer according to an embodiment.

According to an embodiment, in a method of providing MRC question and answer, a user question is received and analyzed (operation S810 and operation S820), at least one document is selected in at least one domain based on the analyzed question, and a passage is searched for in the selected document (operation S830).

At least one correct answer candidate value is obtained by applying at least one MRC question and answer algorithm to each retrieved passage (operation S840), it is determined whether the obtained at least one correct answer candidate value is a correct answer (operation S850), and a best answer value or no result is provided as an answer to a user (operation S860).

Figure 9:
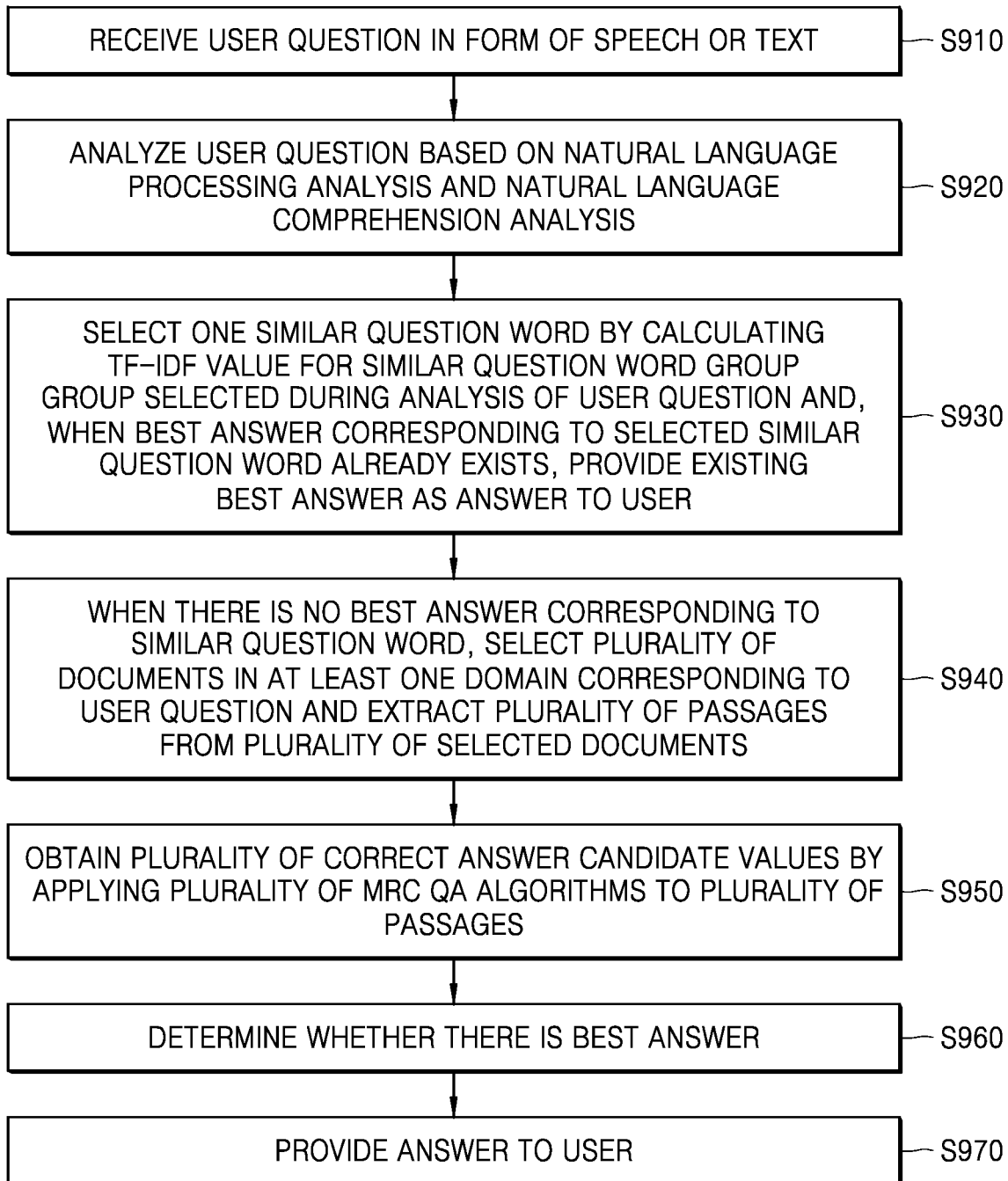

FIG. 9 is a flowchart of a method of providing MRC question and answer according to another embodiment.

According to an embodiment, in a method of providing MRC question and answer, a user question is received in the form of a speech or a text and the user question is analyzed based on a natural language processing analysis and a natural language comprehension analysis (operations S910 and S920).

When one similar question word is selected from a similar question word candidate group selected through a similar question word matching scheme during the analysis of a user question and a best answer value corresponding to the selected similar question word already exists, the existing best answer value is provided as an answer to a user (operation S930).

When there is no best answer value corresponding to the similar question word, a plurality of documents are selected in at least one domain corresponding to the user question and a plurality of passages are extracted from the selected plurality of documents (operation S940). Thereafter, a plurality of MRC question and answer algorithms are applied to the plurality of passages to obtain a plurality of correct answer candidate values (operation S950). It is determined whether there is a best answer value from among the plurality of correct answer candidate values. When there is a best answer value, the best answer value is provided as an answer to a user. When there is no best answer value, information indicating no result is provided to the user (operations S960 and S970).

Figure 10:
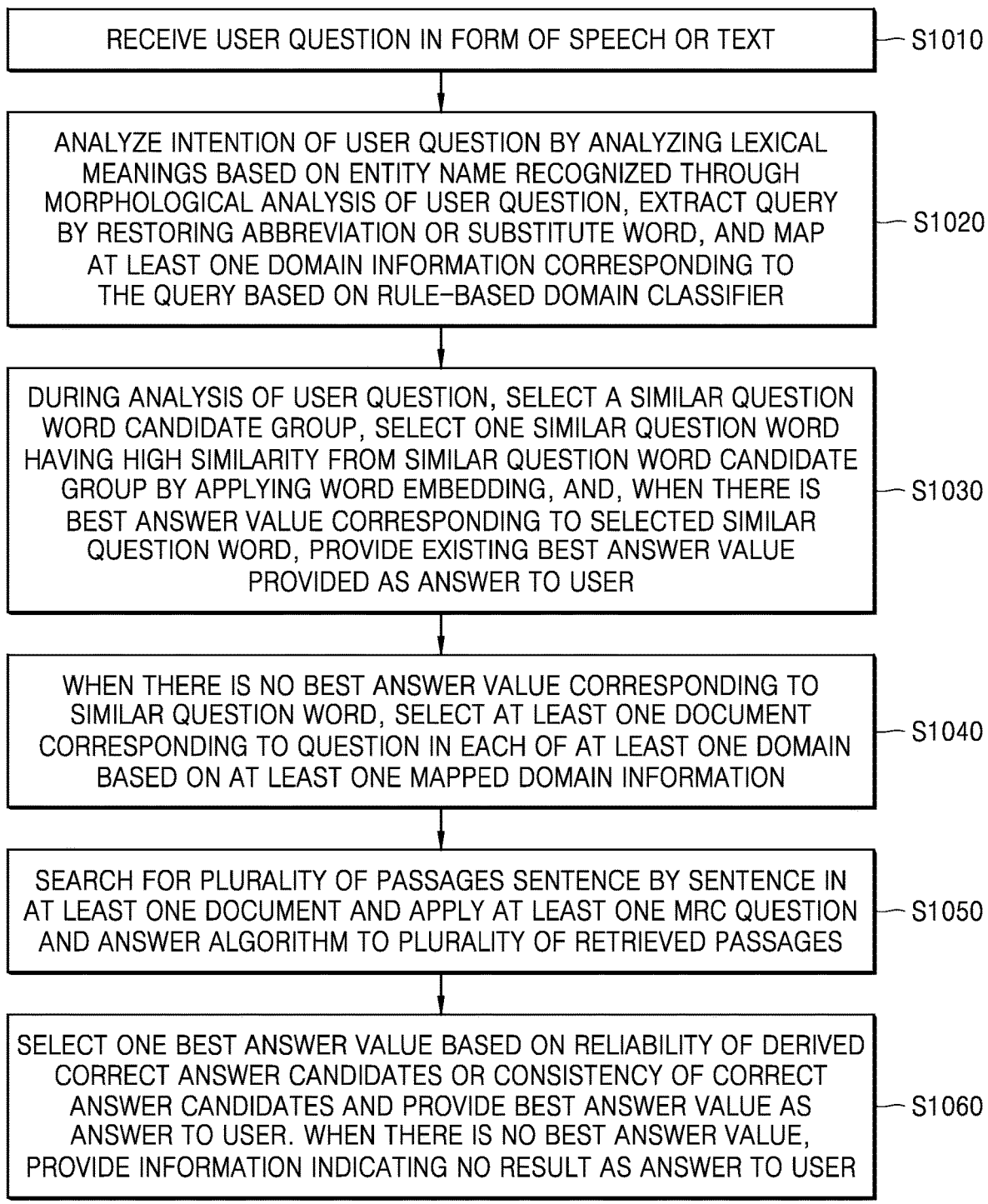

FIG. 10 is a flowchart of a method of providing MRC question and answer according to another embodiment.

According to an embodiment, in a method of providing MRC question and answer, a user question is received in the form of a speech or a text (operation S1010). Thereafter, the intention of the user question is analyzed by analyzing lexical meanings based on the entity name recognized through a morphological analysis of the user question, a query is extracted by restoring an abbreviation or a substitute word, and at least one domain information corresponding to the query is mapped based on a rule-based domain classifier (operation S1020).

During the analysis of the user question, when a similar question word candidate group is selected, one similar question word having a high similarity is selected from the similar question word candidate group by applying word embedding, and, when there is a best answer value corresponding to the selected similar question word, the existing best answer value is provided as an answer to the user (operation S1030).

When there is no best answer value corresponding to the similar question word, at least one document corresponding to the question is selected in each of the at least one domain based on the at least one mapped domain information (operation S1040).

Then, after searching for a plurality of passages sentence by sentence in the at least one document and applying at least one MRC question and answer algorithm to the plurality of retrieved passages (operation S1050), one best answer value is selected based on the reliability of derived correct answer candidates or the consistency of the correct answer candidates and provided as an answer to the user. When there is no best answer value, information indicating no result is provided as an answer to the user (operation S1060).

The apparatus described above may be implemented as a hardware component, a software component, and/or a combination of hardware components and software components. For example, the devices and components described in the embodiments may be implemented by using one or more general purpose or special purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may also access, store, manipulate, process, and generate data in response to execution of software. For the convenience of explanation, it has been described above that one processing device is used. However, it would be obvious to one of ordinary skill in the art that the processing device may include a plurality of processing elements and/or a plurality of types of processing elements. For example, the processing device may include a plurality of processors or one processor and one controller. Also, other processing configurations like parallel processors may be employed.

The software may include a computer program, code, instructions, or a combination of one or more of the foregoing, to configure the processing device to operate as demanded or to command the processing device independently or collectively. For the purpose of interpreting or providing instructions or data to the processing device, software and/or data may be permanently or temporarily embodied in any type of machine, component, physical device, virtual equipment, computer storage medium, or a signal wave to be transmitted. The software may be distributed over networked computer systems so that they may be stored or executed in a distributed manner. The software and data may be stored on one or more computer-readable recording media.

The methods according to embodiments may be embodied in the form of program instructions that can be executed by various computer means and recorded on a computer-readable recording medium. The computer-readable recording media may include program instructions, data files, and data structures alone or a combination thereof. The program commands recorded on the medium may be specially designed and configured for example embodiments or may be published and available to one of ordinary skill in computer software. Examples of the computer-readable recording medium include a hardware device specially configured to store and perform program instructions, for example, a magnetic medium, such as a hard disk, a floppy disk, and magnetic tape, an optical recording medium, such as a CD-ROM, a DVD, and the like, a magneto-optical medium, such as a floptical disc, ROM, RAM, a flash memory, and the like. Examples of program commands include machine language code such as code generated by a compiler, as well as high-level language code that may be executed by a computer using an interpreter or the like. The hardware device described above may be configured to operate as one or more software modules to perform the operations of the embodiments, and vice versa.

Although the embodiments have been described by the limited embodiments and the drawings as described above, various modifications and variations are possible to one of ordinary skill in the art from the above description. For example, the described techniques may be performed in a different order than the described method, and/or components of the described systems, structures, devices, circuits, etc. may be combined or combined in a different manner than the described method, or other components. Or even if replaced or substituted by equivalents, an appropriate result can be achieved.

According to an embodiment, a method of providing MRC question and answer may provide a best answer by understanding the meaning of a user's question and, based on the meaning, applying at least one MRC question and answer algorithm to at least one document and at least one passage associated with a searched domain.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A machine reading comprehension (MRC) question and answer providing method comprising:
   receiving a user question data in a speech format or a text format;
   analyzing an intention of the user question data by analyzing a lexical meaning based on an entity name recognized through a morphological analysis of the user question data, extracting a query by restoring an abbreviation word or a substitute word and mapping a plurality of domains corresponding to the query based on a rule-based domain classifier;
   selecting a similar question word candidate group similar to the user question data, selecting a similar question word having a high similarity from the similar question word candidate group by applying word embedding and in case that there is a first answer value corresponding to the similar question word, providing the first answer value to a user;
   wherein in case that there is no first answer value corresponding to the similar question word:
   selecting a plurality of documents corresponding to the query based on the plurality of domains;
   searching for a plurality of passages, sentence by sentence in the plurality of documents and obtaining candidates by applying a plurality of MRC question and answer algorithms to the plurality of passages;

determining whether there is a second answer value based on reliability values of the candidates or consistency values of the candidates; and in case that there is the second answer value, providing the second answer value to the user; and wherein in case that there is no second answer value, providing information indicating no result as an answer to the user.

2. A machine reading comprehension (MRC) question and answer providing method comprising:

receiving a user question data;

analyzing the user question data;

selecting a plurality of documents from a plurality of domains corresponding to the user question data;

searching for a plurality of passages including candidates for an answer value determined as being suitable for the user question data, in the plurality of documents;

obtaining N*M candidates by inputting the user question data and the plurality of passages into a plurality of MRC question and answer units, wherein N is the number of the plurality of passages, and M is the number of the plurality of MRC question and answer units;

determining the answer value based on whether a 'reliability value of each of the N*M candidates' exceeds a 'threshold value'; and providing the answer value to a user.

3. The MRC question and answer providing method of claim 2, wherein, in the determining, a plurality of candidates having the same reliability value from among the N*M candidates are determined as the answer value.

4. The MRC question and answer providing method of claim 2, wherein, in the determining, the answer value or information indicating no result is provided.

5. The MRC question and answer providing method of claim 2, wherein the plurality of passages is extracted, based on whether a data size of each of the plurality of passages is equal to or greater than a predetermined byte value, and the predetermined byte value is automatically adjusted to an optimal byte value determined based on machine learning regarding a correct answer candidate value determined as the answer value.

6. A machine reading comprehension (MRC) question and answer providing method comprising:

receiving a user question data in a speech format or a text format;

analyzing the user question data based on a natural language processing analysis and a natural language comprehension analysis;

selecting a similar question word candidate group similar to the user question data, selecting a similar question word having a high similarity from the similar question word candidate group based on a term frequency-inverse document frequency (TF-IDF) value and in case that there is a first answer value corresponding to the similar question word, providing the first answer value to a user;

wherein in case that there is no first answer value corresponding to the similar question word:

selecting a plurality of documents based on a plurality of domain information corresponding to the user question data and extracting a plurality of passages in the plurality of documents;

obtaining N*M candidates by inputting the user question data and the plurality of passages into a plurality of MRC question and answer units, wherein N is the number of the plurality of passages, M is the number of the plurality of MRC question and answer units determining whether there is a second answer value based on reliability values of the N*M candidates or consistency values of the N*M candidates, and in case that there is the second answer value, providing the second answer value to the user; and wherein in case that there is no second answer value, providing information indicating no result as an answer to the user.

* * * * *